United States Patent Office 3,174,624
Patented Mar. 23, 1965

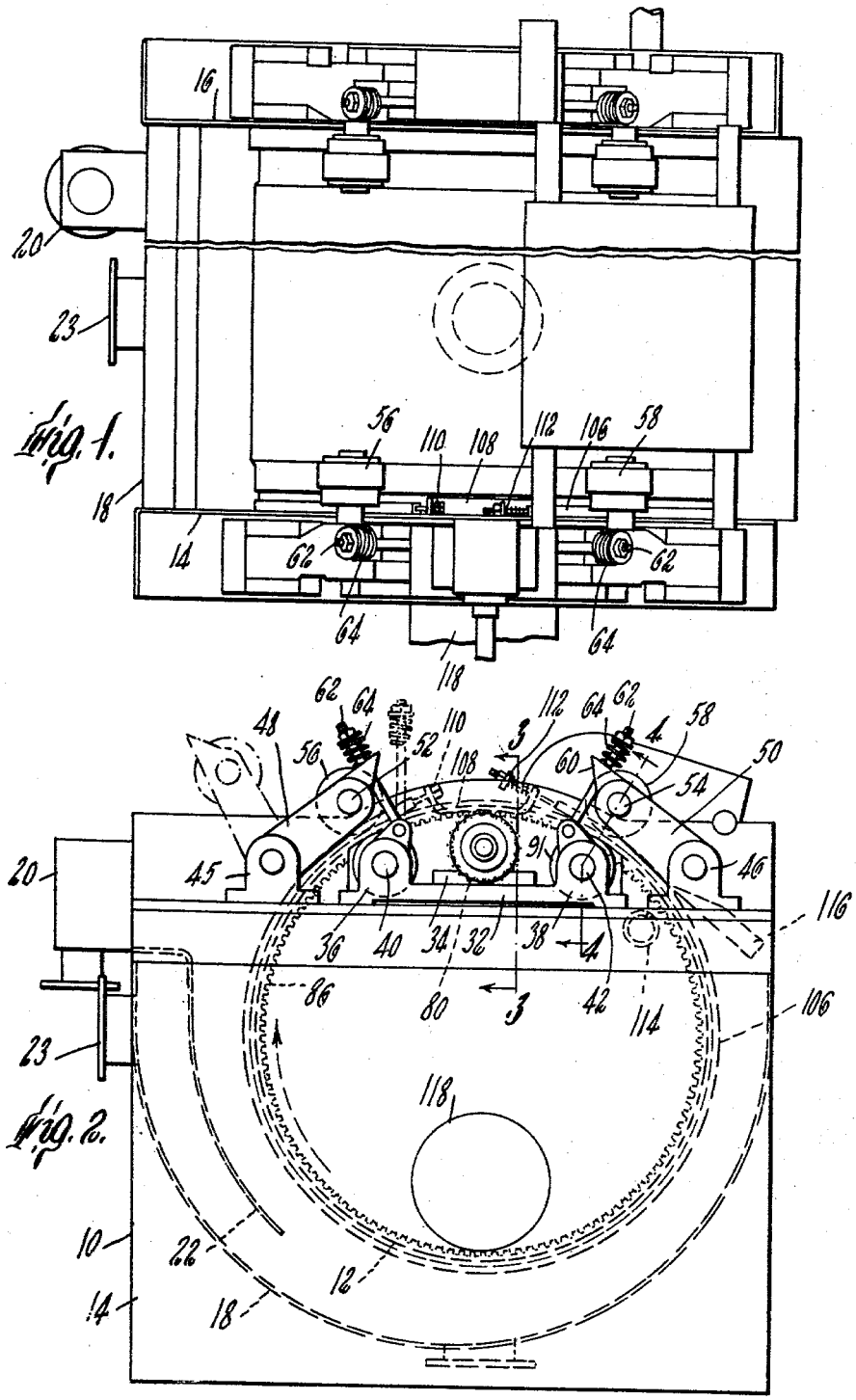

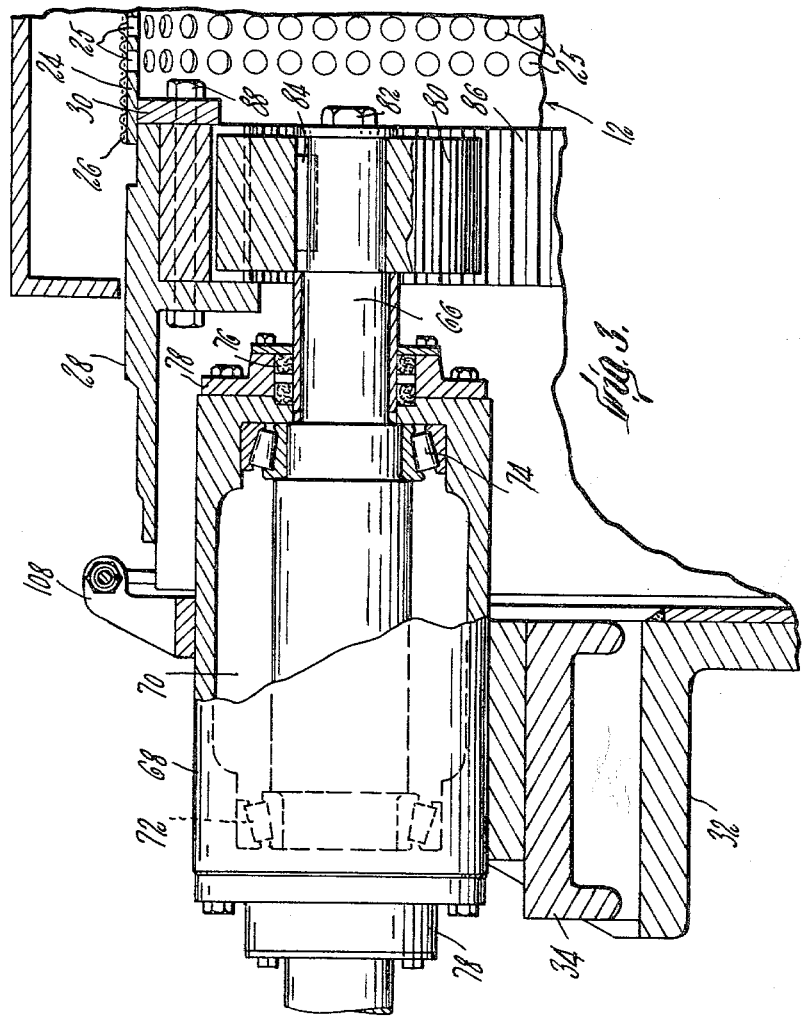

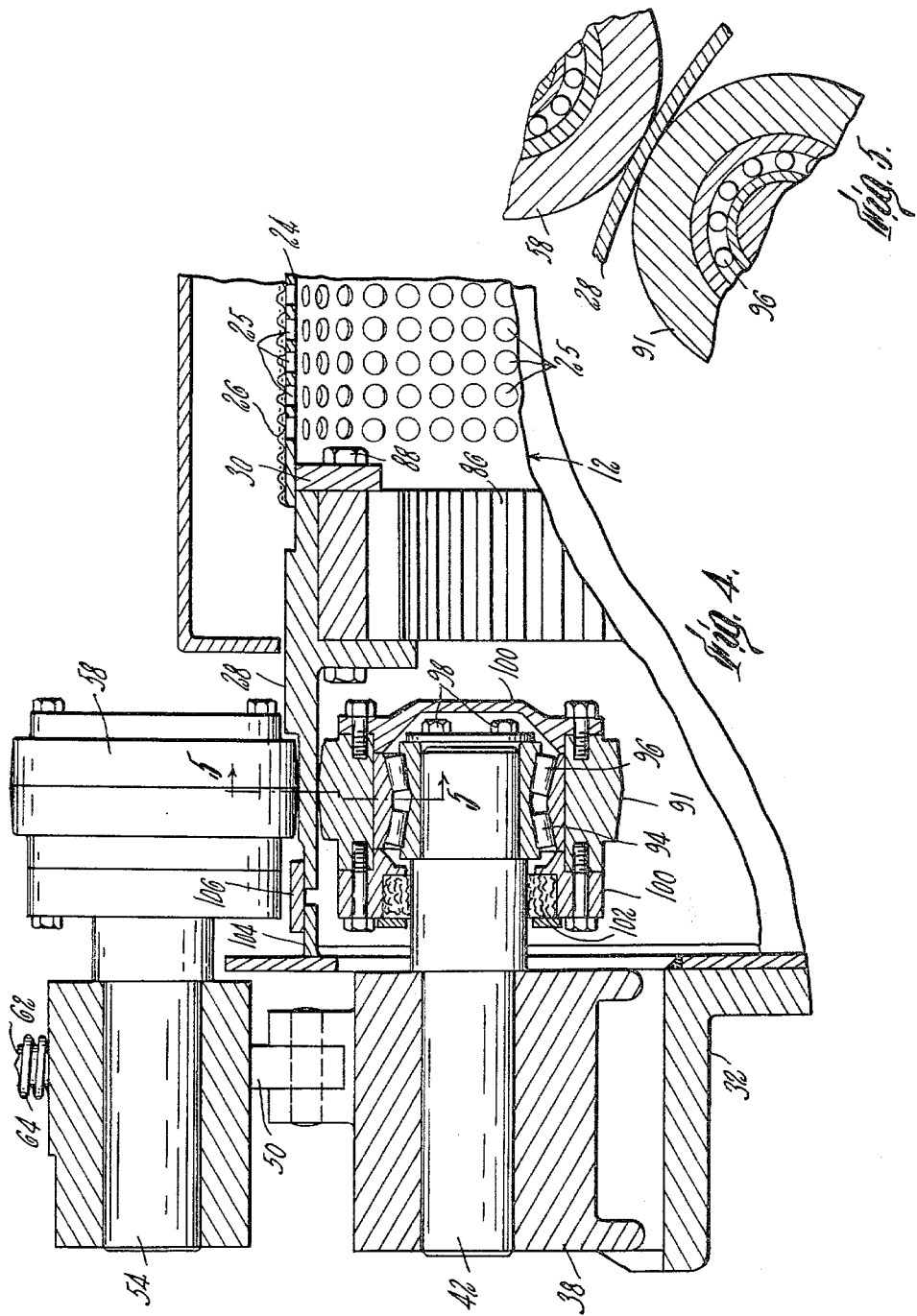

3,174,624
FILTER
Neil F. Putnam, Nashua, N.H., assignor, by mesne assignments, to Improved Machinery, Inc., Nashua, N.H., a corporation of Delaware
Continuation of application Ser. No. 3,855, Jan. 21, 1960. This application Oct. 1, 1962, Ser. No. 227,329
2 Claims. (Cl. 210—402)

This invention relates generally to filter mechanisms which are suitable for the separation of liquid-solid mixtures and more particularly to a novel and improved rotary filter apparatus of that type. It is a continuation of my application Ser. No. 3,855, filed January 21, 1960, now abandoned.

In high production systems wherein screening or filtering of large quantities of liquid-solid mixtures is desired, rotary horizontal drum mechanisms have long been utilized. Heretofore, horizontal drum filters have consisted of a foraminous cylinder, usually screen wire covered, supported for rotation partially submerged in a tank containing a liquid-solid slurry to be filtered by means of a horizontal shaft. The supporting structure between the shaft and cylinder consists of wheel-like spiders having spokes extending between the shaft and the surrounding cylinder. A series of such spiders was necessary not only to prevent the cylinder from sagging, but also to maintain it in a true cylindrical shape, even in the presence of forces due to the partial submergence of the drum in the slurry to permit passage of filtrate through the drum surface under the influence of reduced or atmospheric pressures needed for accreting a filter cake on the cylinder. The true cylindrical shape was essential because of the presence of a couch roll or other devices which must operate at a close and uniform clearance against the outer surface of the cylinder throughout its length for the purpose of removing the accreted filter cake from the outer surface of the cylinder. The horizontal shaft as well had to be of substantial construction to prevent drum sagging and as well had to be provided with stuffing boxes or other seals where it projected through the end of the tank. This construction caused bearing and lubrication problems, particularly where corrosive liquids were concerned. Adequate filtrate level control dams also presented constructional problems with such machines. In general, the assemblies required suitably to support the cylinder and shaft necessarily are massive and hence expensive, particularly in large cylinders.

Although the above described filter structures have been widely used, they have been known to have a number of disadvantages. Thus, at the high rotational speeds that are being utilized in modern filtering equipment of this type, the spiders or other interior support members create a turbulence adjacent the foraminous surface which interferes with the proper and efficient accretion of filter cake on the surface. Also, the couch roll provided a difficult maintenance problem, only partially because of cylinder roundness problems, and hence does not work as well as might be desired. Further it is not infrequently necessary to remove the drum from the tank for cleaning or repair and the removal of a conventional shaft mounted filter drum involves certain complexities and often requires a considerable amount of time. These factors tend to make the proper maintenance of such installations fairly expensive.

Accordingly it is a principal object of this invention to provide an improved rotary filter mechanism which utilizes a novel and simple mounting structure.

Another object of the invention is to provide a rotary drum apparatus in which the cylindrical filtering member is supported in a manner such that the central shaft and supporting spiders and the like may be entirely eliminated, as likewise may the seals and bearings for such central shaft. As a result, tank or vat construction is much simplified and much more efficient filtrate level control dams may be employed if such be desired. This elimination of elements has the important effect of greatly minimizing turbulence in the cylinder interior and hence provides more efficient operation.

A further object of the invention is to provide improved means for mounting a rotary filtering drum so that the drum may be easily and quickly removed from the supporting members and the tank in which it is suspended.

Still another object of the invention is to provide in conjunction with a rotary filter mechanism a construction which enables the positioning of the support mechanism and drive apparatus adjacent the upper portion of the tank, above the level of the mixture normally therein and in position so that they are accessible for maintenance purposes.

In accordance with the principles of the invention there is provided a tank in which the rotary filtering member is suspended. The rotary member is provided with cylindrical axially extending rim structures which are secured to the ends of the foraminous surface portion thereof. These rims cooperate with rotatable elements in the form of two peripherally spaced pairs of rollers mounted adjacent the end walls of the tank and in fixed relationship thereto well above the level of the slurry therein so that the rims are engaged by each roller of a pair on opposite sides thereof to clamp the rim therebetween, one roller of each pair being positioned radially inwardly of the rim and one radially outwardly of the rim along a radius thereof. The two pairs of rollers at each end of the drum are peripherally spaced along the rim, and, by reason of the rollers of each pair clamping the rim directly therebetween, entirely avoid imposing deforming forces on the drum. Thus the drum is suspended within the tank in suitable position for the filtering operation. No support elements whatsoever need be positioned within the cylinder. This construction provides a simple and economical apparatus which is completely reliable in operation. As there are no internal support members the drum may be operated at comparatively high speeds without any adverse effect on the formation of the filter cake. In addition air or filter cake removing devices, for example, may be positioned within the drum at fixed positions relative to the tank for removing the filter cake. In the preferred embodiment of the invention there are provided the rollers outwardly of the rim, the hold-down rollers are resiliently biased against the outer surface of the rim opposite the supporting rollers, inwardly of the rim and are so supported by a pivotally mounted arm adapted to be pivoted so that the hold-down rollers may be moved away from the rim to permit removal of the drum. The drive means for the drum preferably includes an internal gear secured to one of the rims and a pinion gear and shaft mounted above the axis of the drum and the level of liquid in the tank, adjacent one end wall which pinion gear meshes with the internal gear. The pinion gear shaft is mounted on the same support structure as are the rotatable support rollers and the hold-down rollers associated with that rim. Thus the filter member is securely positioned within the tank and is positively driven by the gear train. This construction enables the filter member to be comparatively easily removed from the tank. In addition to providing an improved filtering action the filtering apparatus constructed according to the invention is considerably less expensive both in construction and in operation than comparable conventional rotary filters for a variety of reasons due to the elimination of such major elements as the central shaft, its packings and bearings and spiders as well as the couch roll. Also as pointed out above, the elimination of these elements improves the efficiency of operation to a substantial extent, so that the filter of the present invention, besides being less expensive to manufacture and maintain, is significantly more efficient in its operation both as to increased speed and effective filtering.

Other objects and advantages of the invention will be seen as the following description of a preferred embodiment thereof progresses, in conjunction with the drawings, in which:

FIG. 1 is a plan view of the rotary filtering apparatus constructed in accordance with the preferred embodiment of the invention;

FIG. 2 is an end elevational view of the apparatus shown in FIG. 1;

FIG. 3 is a sectional view taken along the line 3—3 of FIG. 2;

FIG. 4 is a sectional view taken along the line 4—4 of FIG. 2 showing details of the support and hold-down rollers for the rotary filter element; and FIG. 5 is a sectional view of those rollers taken along the line 5—5 of FIG. 4.

With reference to FIGS. 1 and 2, there is shown a tank 10 in which a rotatable filtering drum 12 is adapted to be disposed for rotation about a horizontal axis. The tank includes two vertical spaced end walls, 14, 16 and a wall portion 18 which joins the two end walls and forms the sides and base of the tank. The material to be filtered is introduced into the tank through the conduit connection 23. A baffle structure 22 which extends the length of the tank between the end walls guides the entering material so as to prevent direct flow thereof against the surface of the filtering member. An overflow connection 20 is also provided.

The drum 12 is a large cylindrical member which has a thin perforated shell 24 which in the described embodiment is manufactured from a sheet of stainless steel approximately three-sixteenths of an inch in thickness. A multiplicity of holes 25 are bored in this shell. A suitable screen 26 is trained over the cylindrical surface of the shell to provide an appropriate foraminous filtering surface. Details of this drum surface may be seen in FIGS. 3 and 4.

At either end of the cylindrical filtering drum there is provided an outwardly extending rim 28. As shown in FIGS. 3 and 4 there is a reinforcing ring 30 secured at the end of the shell. Bolted to this reinforcing ring is the rim which thus is secured to and extends outwardly from the end of the filtering surface.

Mounted beyond each end wall of the tank is a support framework 32 which carries a plurality of pillow blocks. Thus on the framework adjacent end wall 14 there is mounted a pillow block assembly 34 which carries the filter drive shaft. Disposed to either side of this pillow block is a similar block 36, 38 which carry the supporting roller shafts 40, 42. Disposed to the outside of these blocks are blocks 45, 46 on which are pivotally mounted hold-down roller lever members 48, 50. Shafts 52, 54 which support the hold-down roller lever members 56, 58 are secured to and extend inwardly of the tank from the upper ends of these levers. Ear portions 60 on the levers cooperate with a pivoted bolt 62 and spring element 64 which are adapted to secure the cooperating hold-down roller against the upper side of the rim to secure that rim in position on the support rollers. The elements on the framework adjacent end wall 16 are similar with the exception that there is no drive shaft pillow block on that framework.

As may be seen in FIG. 3 the drive shaft 66 passes through the pillow block housing 68 and a lubricant reservoir 70 and is supported by tapered roller bearing assemblies 72, 74 positioned at either end of the reservoir. Conventional seals 76 are positioned in each end cap 78 associated with the pillow block housing. A pinion gear 80 is mounted on the inboard end of the drive shaft, secured thereto by means of bolt 82 and key 84. This pinion gear cooperates with an internal ring gear 86 which is secured between the flange reinforcing ring 30 and the rim 28 by means of bolts 88.

The shaft 66 is driven through any suitable means. Other means of driving the cylinder may be utilized if desired, of course. For example, a shaft mounted reducer drive means might be utilized. Also, one or more of the support or hold-down rollers might be driven and through their contact with the rim the cylinder is driven frictionally.

Details of the supporting roller mechanisms and the hold-down roller mechanisms may be understood with reference to FIGS. 4 and 5. In those figures there is shown the framework 32 and a supporting roller mechanism and cooperating hold-down roller mechanism. As the physical construction of the supporting rollers and the hold-down rollers are similar, a sectional view of a support roller only is shown. The support roller 91 is mounted on the stub-shaft 42 which extends inwardly from the supporting pillow block structure 38. Two sets of tapered roller bearings 94, 96 are mounted within the roller structure to provide adequate bearing and thrust characteristics for that member. The roll assembly is secured on the shaft 42 by bolts 98 and suitable end plates 100 and seals 102 prevent the entrance of contaminants. The cooperating hold-down roller 58 whose stub-shaft 54 is carried by the associated pivotally mounted lever member 50 is biased by the bolt 62 and spring 64 assembly into contact with the outer surface of the rim 28 opposite the supporting roller. The relationship of these rollers may also be seen in FIG. 5.

The end of the rims are sealed relative to the adjacent end walls by means of a deckle strap construction. There is provided on the inner wall of each end wall a cylindrical flange 104 (FIG. 4) which cooperates with and is disposed adjacent the end of the rim. A deckle strap 106 is disposed across the junction between the wall flange 104 and the rim 28 in sealing relationship. As shown in FIG. 2 there is positioned at the top of the end wall a bracket 108 which carries a stud 110 at one end and a spring and bolt assembly 112 at the other end. These elements cooperate with the deckle strap 106 to enable tension to be maintained on that strap so that the space between the wall flange and the end of the rim is effectively sealed. This construction thus prevents flow of the material within the tank into the interior of the drum through the ends thereof.

This improved filter construction, as has been noted, enables the use of a cylindrical foraminous filter drum surface which has no central supporting elements and without spiders or similar devices which extend from the center outward to the walls thereof. With this construction, compartments or "white water pockets" may be installed on the outer ends of the tank, if desired. These compartments receive the filtrate from the cylinder and contain dams which control the interior level of the filtrate. As there is no central shaft the construction of suitable compartments is much easier and less expensive. Also the absence of a central shaft eliminates large packing boxes which are expensive and require considerable maintenance. In addition to the simplicity of the shell configuration, the construction also enables the provision of members which extend longitudinally adjacent the inner surface of the drum the entire length thereof. For example, in the described embodiment as shown in FIG. 2 there is provided a pipe 114 into which air under pressure is supplied. This pipe is disposed adjacent the discharge chute 116 and is arranged so that air pressure may be directed through apertures in the pipe to aid in the freeing of the pulp mat accreted on the foraminous surface from that surface for discharge into the chute. The fact that the pulp mat may be "blown" off the surface allows more latitude in the accuracy of the cylinder surface as couch rolls or close clearance doctors are not required. Other similar air or water showers could be also disposed within the cylindrical drum at desired locations and vacuum devices could be employed if desired.

In operation the material to be filtered is introduced into the tank through conduit 23. There is a tendency for the liquid in the mixture to flow through the foraminous surface of the drum into the interior thereof and as the drum rotates in a clockwise direction a pulp mat of the solids is accreted in the surface thereof. The liquid component drains into the interior of the drum and is extracted through the conduit 118 in the end wall 14. As the mat approaches the discharge chute the air pressure applied through pipe 114 tends to free the mat from the foraminous surface and the mat is transferred to the chute for removal and further processing as desired.

It will be seen that the filter drum member may be easily removed from the tank. Any pipes such as the air supply pipe 114 are disconnected and removed. Then the deckle straps 106 are removed and the spring assemblies associated with the hold-down members are freed and pivoted inwardly so that the supporting levers for the hold-down levers may be moved to the dotted line position indicated in FIG. 2. The supporting rollers and the pinion drive gear are removed. The drum then may be lifted substantially vertically. Thus the removal of the drum from the tank is accomplished in a simple and straightforward manner. It will be thus evident that the invention, in addition to providing a much more economical rotary filter construction, increases the ease of maintenance. It will also be seen that the device has several advantages in flexibility and in its adaptability to associated equipment.

Although the device shown and described is a gravity filter it will be understood that principles of the invention are applicable to rotary filters of other types. Thus while a preferred embodiment of the invention has been shown and described it will be understood that the invention is not intended to be limited thereto or to details thereof and departures may be made therefrom within the spirit and scope of the invention as defined in the claims.

I claim:

1. A rotary drum filter comprising a supporting frame including a tank adapted to contain a liquid-solid mixture to be filtered, a cylindrical drum having a foraminous surface adapted to accrete a filter cake thereon, said drum being disposed for rotation about a horizontal axis and being partially submerged in a liquid-solid mixture in said tank, and means supporting said drum including axially extending cylindrical rim means at each end of said drum and two peripherally spaced pairs of rollers supported for rotation on said frame above the axis of said durm at each end of said drum engaging each said rim means in cooperating relationship on opposite sides thereof, the rollers of each said spaced pairs of rollers being radially aligned, one radially inwardly and one radially outwardly of said rim means to clamp said rim means directly between the rollers of each pair, with said pairs of rollers at each end of said drum being peripherally spaced along said rim means for supporting the drum for rotation, each said roller radially outwardly of said rim means being supported by means of an arm pivotally mounted on said supporting frame, resilient means for urging each said radially outward roller into engagement into said rim for securely positioning said drum, each said arm being adapted to be pivoted so that said radially outward roller may be moved generally away from said rim to permit removal of said drum from said supporting frame, and drive means including a driven shaft supported on said frame above the axis of said drum, a pinion gear carried on and driven by said shaft, and gear means around the periphery of said drum in engagement with said pinion gear for driving said drum on said rollers.

2. A rotary drum filter comprising a supporting frame including a tank adapted to contain a liquid-solid mixture to be filtered, a cylindrical drum having a foraminous surface adapted to accrete a filter cake thereon, said drum being disposed for rotation about a horizontal axis and being partially submerged in a liquid-solid mixture in said tank and means supporting said drum including axially extending cylindrical rim means at each end of said drum, and two peripherally spaced pairs of rollers supported for rotation on said frame above the axis of said drum at each end of said drum engaging each said rim means in cooperating relationship on opposite sides thereof, the rollers of each said spaced pairs of rollers being radially aligned, one radially inwardly and one radially outwardly of said rim means to clamp said rim means directly between the rollers of each pair, with said pairs of rollers at each end of said drum being peripherally spaced along said rim means for supporting the drum for rotation, each said roller radially outward of said rim means being supported by means of an arm pivotally mounted on said supporting frame, and further including resilient means for urging each said radially outward roller into engagement into said rim for securely positioning said drum, each said arm being adapted to be pivoted so that said radially outward roller may be moved generally away from said rim to permit removal of said drum from said supporting frame, and means for driving said drum.

References Cited in the file of this patent

UNITED STATES PATENTS

| | | |
|---|---|---|
| 622,439 | Bergstrom | Apr. 4, 1899 |
| 1,509,024 | Paramor | Sept. 16, 1924 |
| 1,902,739 | Verstoep | Mar. 21, 1933 |
| 2,878,583 | Spooner | Mar. 24, 1959 |

FOREIGN PATENTS

| | | |
|---|---|---|
| 5,231 | Great Britain | 1909 |
| 344,848 | Germany | Dec. 1, 1921 |

UNITED STATES PATENT OFFICE
CERTIFICATE OF CORRECTION

Patent No. 3,174,624                               March 23, 1965

Neil F. Putnam

It is hereby certified that error appears in the above numbered patent requiring correction and that the said Letters Patent should read as corrected below.

Column 6, line 29, after "each", first occurrence, insert -- end --.

Signed and sealed this 2nd day of November 1965.

(SEAL)
Attest:

ERNEST W. SWIDER
Attesting Officer

EDWARD J. BRENNER
Commissioner of Patents